March 4, 1969     E. FRITSCH     3,431,014

HEADWIND DEFLECTOR

Filed Dec. 9, 1966

INVENTOR
Erich Fritsch
BY
Michael S. Striker
ATTORNEY

United States Patent Office 3,431,014
Patented Mar. 4, 1969

3,431,014
HEADWIND DEFLECTOR
Erich Fritsch, Mettmann, Germany, assignor to Fritsch & Co. HG, Mettmann, Germany
Filed Dec. 9, 1966, Ser. No. 600,662
Claims priority, application Germany, Dec. 11, 1965, F 29,249
U.S. Cl. 296—1
Int. Cl. B60r 13/08, 27/00
10 Claims

ABSTRACT OF THE DISCLOSURE

A deflector for the headwind which develops during movement of a vehicle, such deflector having a deflecting portion which extends along a transversely extending edge portion bounding the front end of an opening provided in the vehicle body, and a mounting portion adapted to be fastened to this front edge portion. Fastening means is provided securing the deflector to the front edge portion, and positioning means is releasably connectable to the mounting portion prior to fastening thereof to the front edge portion and receivable in a recess provided along the front edge portion to thereby position the deflector in predetermined relationship relative to the front edge portion during fastening with the fastening means.

CROSS-REFERENCES TO RELATED APPLICATIONS

I have described another deflector, also suitable for deflecting the headwind which develops during movement of a vehicle, in my copending application, entitled "Deflector for Head Wind," Ser. No. 363,251, and filed on Apr. 28, 1964.

BACKGROUND OF THE INVENTION

The present invention relates to automotive vehicles in general, and more particularly to a deflector which serves to prevent entry of headwind through an opening provided in that section of the body of an automotive vehicle which surrounds the top and the sides of the passenger department. Still more particularly, the invention relates to a deflector provided with positioning means which is capable of maintaining the deflector in its proper predetermined position relative to the remainder of the body of the vehicle during the actual mounting of the deflector on the body.

It is known to provide headwind deflectors which are usually secured at the transversely extending edge portion bounding a front end of an opening provided in the vehicle body, generally in the roof skin of an automotive vehicle. It is evident that these deflectors, which are relatively long since they extend over a substantial portion of the width of the vehicle, must be properly positioned if they are to function as intended and to deflect the headwind away from the opening in the body. Thus, the deflector must have not only a predetermined inclination with respect to the direction of motion of the vehicle, but it also must be of identical height as seen in the direction transversely of the elongation of the vehicle.

This latter problem, however, sometimes presents difficulties. There are types of vehicles, and particularly automotive vehicles, in which the front edge bounding the opening in the vehicle body, in which opening a so-called "sun roof" in the form of a panel is slidable to and fro so as to permit exposure and closing of the opening at will, is provided with a recess which extends along this front edge portion transversely of the elongation of the vehicle. For various reasons, it is not possible simply to let the lower edge of the deflector engage the bottom wall of this recess. One of these reasons has to do with the fact that in such case the deflector would not be properly elevated with reference to the remainder of the roof.

This, however, means that it is very difficult to properly position the deflector during the installation thereof since it is almost impossible for a single worker to hold the deflector in place in proper position while he secures it to the front edge portion bounding the opening with screws, bolts or another suitable fastening means.

SUMMARY OF THE INVENTION

It is therefore a general object of the invention to overcome the disadvantages outlined above.

A more specific object of the invention is to provide an arrangement which permits positioning of the headwind deflector in predetermined relationship relative to the front edge portion bounding the opening, and to make possible such positioning prior to and during the assembly or fastening of the deflector to the vehicle body.

An additional object of the invention is to provide such an arrangement which is adaptable so that it can be used with recesses of different depth.

Yet another object of the invention is to provide such an arrangement which is very simple and inexpensive and which may be mounted on all or nearly all types of road vehicles, on water craft, on many types of aircraft, motorized sleds and other types of conveyances which can travel at considerable speed so that the headwind which develops when the vehicle is in motion would be likely to be an objectionable and adverse influence on the comfort of the passengers whenever the opening in the body is exposed.

In accordance with one feature of my invention, I provide, for use in a vehicle body of the type outlined above, the combination of an elongated deflector which includes a deflecting portion extending along and upwardly beyond the edge portion bounding the opening in the vehicle body so as to deflect wind from the opening, and a mounting portion adapted to be fastened to the front edge portion. The combination further includes fastening means for fastening the mounting portion to the front edge portion in predetermined relationship relative thereto. Finally, I also provide as part of the combination a positioning means releasably connectable to the mounting portion prior to fastening thereof to the front edge portion and arranged to abut in thus connected state the front edge portion so as to thereby position the deflector in the predetermined relationship during fastening of the mounting portion to the front edge portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
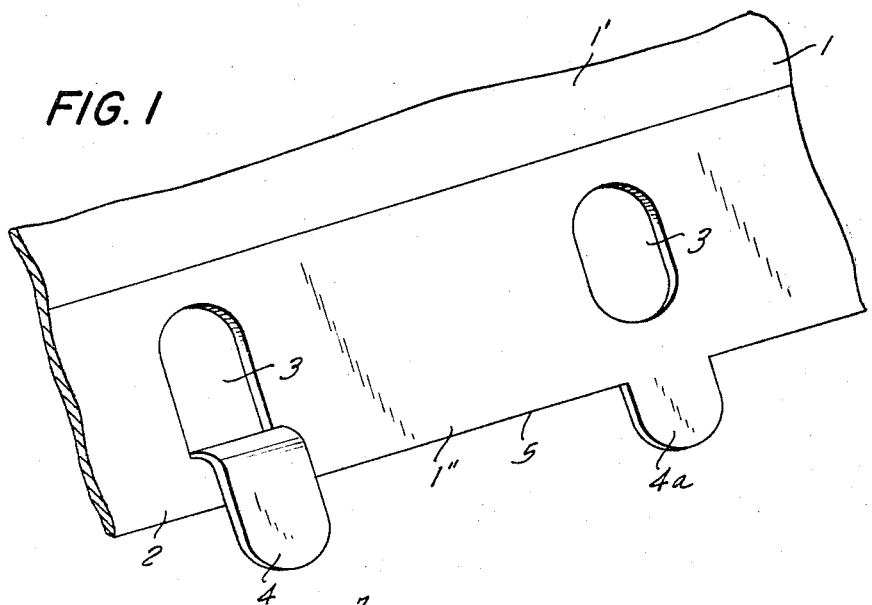
FIG. 1 is a fragmentary elevational view of a headwind deflector in accordance with the present invention.

Discussing now the drawing in detail, and firstly FIG. 1 thereof, it will be seen that the headwind deflector itself is indicated with reference numeral 1. The general configuration of this deflector will be evident from FIG. 3 where it is assumed that the right-hand half of such a deflector is shown, a mirror-symmetrical left-hand portion having been omitted as not essential for an understanding of the invention.

The deflector comprises a deflecting portion 1', and at the lower end thereof, a mounting portion 1" which is generally coextensive with the deflecting portion. The lower edge portion of the mounting portion is identified with reference numeral 2 and it will be seen that the mounting portion 1" is provided in the region of the lower edge portion 2 and upwardly thereof with a plurality of elongated slots or openings 3 through which a suitable fastening means, such as a screw or bolt, may be passed to be secured to the body of the vehicle on which the deflector is to be mounted. Evidently, the fact that the slots 3 are elongated permits necessary adjusting of the positioning of the deflector wherever the fastening means are loosened, and when such adjusting has been accomplished the fastening means will of course again be tightened.

The slots 3 are advantageously stamped out of the material of the mounting portion 1" and in accordance with the invention the thus stamped-out portions are not completely severed from the remainder of the fastening portion 1", but are bent back upon themselves in the form of downwardly extending tongues 4 which extend beyond the lower edge portion 2 of the mounting portion 1". As an alternative it is shown in FIG. 1 that, instead of providing the tongues 4 in the manner just described, tongues 4a can instead be provided by suitably configurating the deflector 1 which latter, it should be noted, is usually also stamped in toto from sheet material.

In accordance with the invention, there is further provided a positioning means which is releasably connectable to the mounting portion 1". This positioning means shown in FIG. 2 comprises a positioning member 6 for each of the tongues 4 or 4a, and it will be seen that the positioning member 6 is provided in an upper face thereof with a downwardly extending depression or pocket 7. These pockets 7 are so configured as to be able to accommodate one of the tongues 4 or 4a therein.

Figure 3:
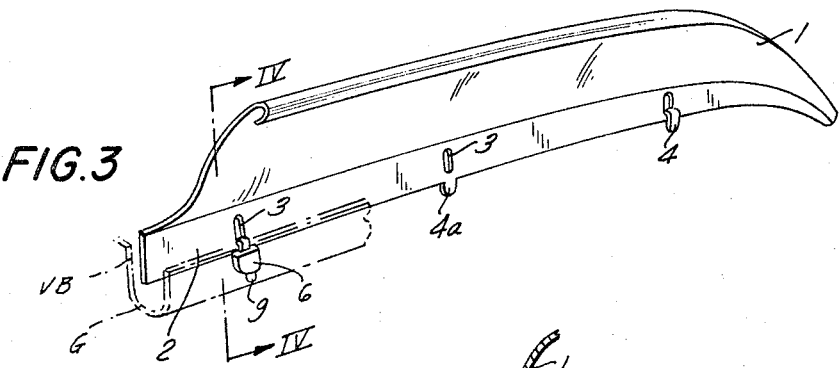
FIG. 3 shows the novel deflector and the positioning means positioned relative to the front edge portion bounding an opening in a vehicle body.

To install the deflector 1 on a vehicle body as outlined earlier, one of the positioning members 6 is placed onto each of the tongues 4 or 4a so that the latter is received in the pocket 7 of the positioning member. This may of course be done by the manufacturer and the complete headwind deflector, with the requisite number of positioning members 6 installed thereon, may be delivered ready for installation on the vehicle. To install the headwind deflector 1 it is simply necessary to let the positioning members 6 be received in the recess along the front edge bounding the opening which is to be protected, and to let the lower face 8 of the respective positioning members 6 abut against the bottom wall of this recess. This is shown in FIG. 3 where the vehicle body is generally designated with VB, whereas the recess or groove is identified with G. It should be pointed out in this connection that the grooves are not necessarily of the configuration shown in FIG. 3; frequently, they are simply in the form of a step, that is that the front edge portion bounding the opening comprises a portion which extends downwardly normal to the general plane of the opening and a second portion at the lower edge of the downwardly extending portion which extends rearwardly as seen in the direction of movement of the vehicle. In other words, in that particular type of arrangement the groove will be actually bounded only on the two sides and will be open not only towards the top but also rearwardly. In any case, however, the lower face 8 of the respective positioning members 6 will abut against the bottom wall of the groove G and the headwind deflector 1 will thus be properly positioned relative to the front edge portion while it is secured to the latter.

Figure 4:
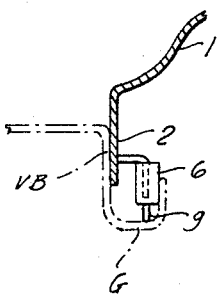
FIG. 4 is a section taken on the line IV—IV of FIG. 3.

FIG. 4 is a section taken on the line IV—IV of FIG. 3 and is believed to be self-explanatory.

Figure 2:
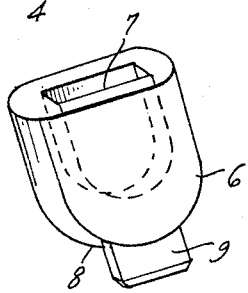
FIG. 2 is a perspective view of a positioning means in accordance with the present invention.

As shown in FIG. 2 the positioning members 6 can also be provided, if this is desired, with downwardly extending projections 9, and these projections 9 can have either a requisite length, or an excessive length. By this it is meant to indicate that the grooves G are of different depth in various different types or makes of vehicles and that it is not always possible to provide a projection 9 of precisely the right length. Therefore, such projections 9 can for instance be made of a length which permits proper positioning of the associated headwind deflector 1 on vehicles having a groove G of maximum depth, and, when the positioning members 6 are then used in vehicles with grooves G of lesser depth, the projections 9 are cut, broken off or otherwise shortened to the requisite length.

Different types of material are suitable for the positioning members 6, but it is preferred to make them either of metal or synthetic plastic material.

If desired, the positioning members 6 and the tongues 4 or 4a can be removed after the headwind deflector 1 has been properly fastened to the vehicle body. This is particularly simple in cases where the groove is bounded only on two sides by walls since it is then simply necessary to bend the respective tongue and its associated positioning member 6 until the tongue breaks off. To facilitate such breaking, the tongue can be scored or otherwise weakened so that it can be more readily broken along such weakened lines.

It should also be pointed out that the tongues 4 and 4a can also be provided, if it should be desired, with ridges or other projections (not shown) to facilitate their proper retention in the pockets 7 while the fastening of the head wind deflector 1 to the body of the vehicle is in process.

It will be understood that each of the elements described above, or two or more together, may also find a useful application in other types of arrangements differing from the types described above.

While the invention has been illustrated and described as embodied in a headwind deflector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In combination with a vehicle body having an opening located in a plane generally parallel with the direction of headwind which develops when the vehicle is in motion, and provided in an edge portion extending transversely of said opening at the front end thereof with a recess bounded by at least a side wall and a bottom wall, the combination of an elongated deflector including a deflecting portion extending along and upwardly beyond said edge portion so as to deflect the wind from said opening, and a mounting portion adapted to be fastened to said side wall, fastening means for fastening said mounting portion to said front edge portion in predetermined relationship relative thereto; and positioning means releasably connectable to said mounting portion prior to fastening thereof to said side wall and arranged to abut in thus connected state at least the bottom wall so as to thereby position said deflector in said predetermined relationship during fastening of said mounting portion to said front edge portion.

2. The combination as defined in claim 1, wherein said mounting portion is provided with elongated slots extending transversely to the elongation of said deflector, and wherein said fastening means comprises threaded fasteners extending through said slots and into said front edge portion.

3. The combination as defined in claim 2, wherein said mounting portion is provided with a lower edge and with projections extending downwardly beyond said lower edge.

4. The combination as defined in claim 3, wherein said projections are stamped from said mounting portion and bent back upon themselves, whereby said elongated slots are obtained.

5. The combination as defined in claim 3, wherein said positioning means comprises positioning members configurated so as to be receivable in said recess and each provided with an upper portion having a pocket in which one of said projections may be accommodated and with a lower portion located in said recess when the respective positioning member is received in the latter.

6. The combination as defined in claim 5 and wherein said positioning members each have an abutment face which is adapted to engage said bottom wall of said recess when the respective positioning member is received in said recess.

7. The combination as defined in claim 6, wherein said abutment face is provided on said lower portion of the respective positioning members.

8. The combination as defined in claim 6, wherein said positioning members each comprise a spacing extension extending from said lower portion, said abutment face being provided on said spacing extension.

9. The combination as defined in claim 8, wherein at least said spacing extension consists of readily severable material so that it can be shortened in dependence upon the depth of said recess.

10. The combination as defined in claim 3, wherein said projections are provided with respective weakened sections so that they may be readily severed from said mounting portion upon fastening of said deflector to said front edge portion.

References Cited

UNITED STATES PATENTS

| | | | |
|---|---|---|---|
| 3,311,406 | 3/1967 | Fritsch | 296—137 X |
| 3,156,175 | 11/1964 | Werner | 296—137 X |

FOREIGN PATENTS 747,081  3/1956  Great Britain.

PHILIP GOODMAN, *Primary Examiner.*

U.S. Cl. X.R.

296—137